United States Patent [19]

Cooper et al.

[11] Patent Number: 4,645,406
[45] Date of Patent: Feb. 24, 1987

[54] CONTAINER LOADER AND TRANSPORT ASSEMBLY

[76] Inventors: Augustus J. Cooper, 775 Crestmont Ave., Yuba City, Calif. 95991; John S. Cooper, 10791 Peoria Rd., Browns Valley, Calif. 95918

[21] Appl. No.: 631,599
[22] Filed: Jul. 17, 1984
[51] Int. Cl.⁴ ............................................. B65G 67/02
[52] U.S. Cl. ..................................... 414/500; 414/542
[58] Field of Search ............... 414/495, 498, 500, 540, 414/541, 542; 74/422

[56] References Cited

U.S. PATENT DOCUMENTS

| | | | |
|---|---|---|---|
| 2,346,424 | 4/1944 | Griffith | 74/422 |
| 2,797,826 | 7/1957 | Kuhlenschmidt et al. | 414/542 |
| 2,812,868 | 11/1957 | Crile | 414/542 |
| 2,836,311 | 5/1958 | Oury | 414/542 |
| 2,950,073 | 8/1960 | McLain et al. | 414/540 X |
| 3,112,836 | 12/1963 | Back | 414/498 |
| 3,180,511 | 4/1965 | Huisman | 414/498 |
| 3,425,576 | 2/1969 | Martin | 414/498 |
| 3,460,697 | 8/1969 | Cowlishaw et al. | 414/498 |
| 3,520,433 | 7/1970 | Blackburn | 414/498 |
| 3,817,413 | 6/1974 | Ham | 414/498 |
| 4,083,429 | 4/1978 | Abbott | 414/541 X |
| 4,245,947 | 1/1981 | Clement | 414/462 |
| 4,297,071 | 10/1981 | Dunbar | 414/542 |

FOREIGN PATENT DOCUMENTS

| | | | |
|---|---|---|---|
| 2306358 | 8/1974 | Fed. Rep. of Germany | 414/542 |
| 87730 | 6/1982 | Japan | 414/498 |
| 862887 | 3/1961 | United Kingdom | 414/542 |

Primary Examiner—Robert J. Spar
Assistant Examiner—Stuart J. Millman
Attorney, Agent, or Firm—Manfred M. Warren; Robert B. Chickering; Glen R. Grunewald

[57] ABSTRACT

A container loader and transport assembly is disclosed which includes a horizontal bed formed for support of a container thereon during transport of the container and loader formed for lifting the container onto the bed from a support surface and lowering the container from the bed to the support surface. The loader is movably mounted to the bed and preferably includes a movable carriage and a lifting mechanism mounted to the carriage. The loader is formed to lift the container and lower it while maintaining the container in substantially horizontal orientation and preferably the carriage is mounted for translation on a pair of extensible rails that can be extended and retracted from an end or from the sides of the container support bed. A method for employing the motor and transport assembly is also disclosed.

4 Claims, 12 Drawing Figures

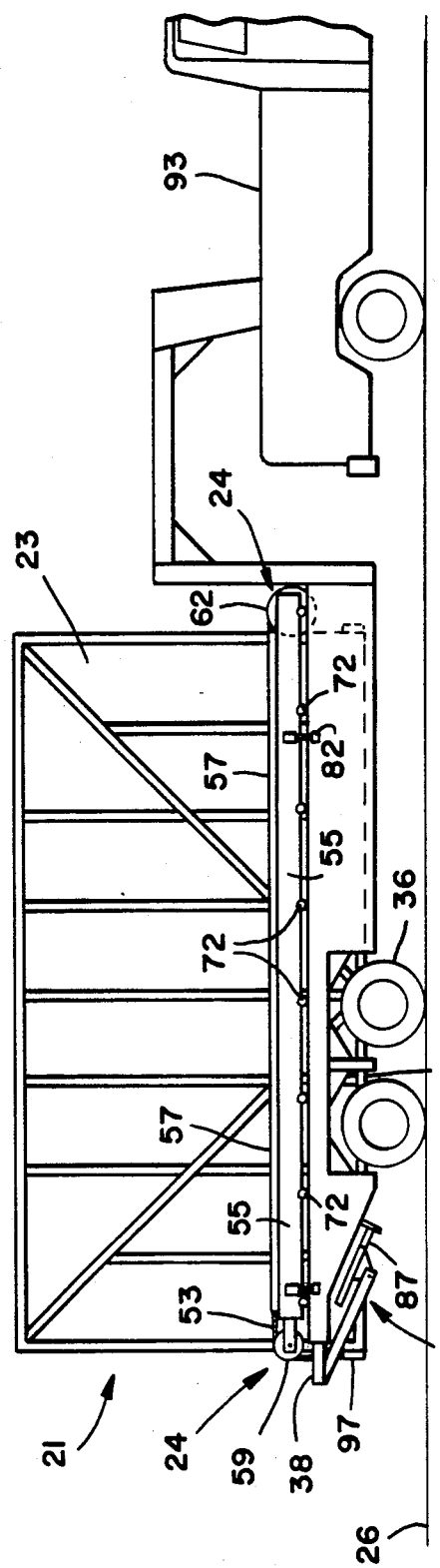
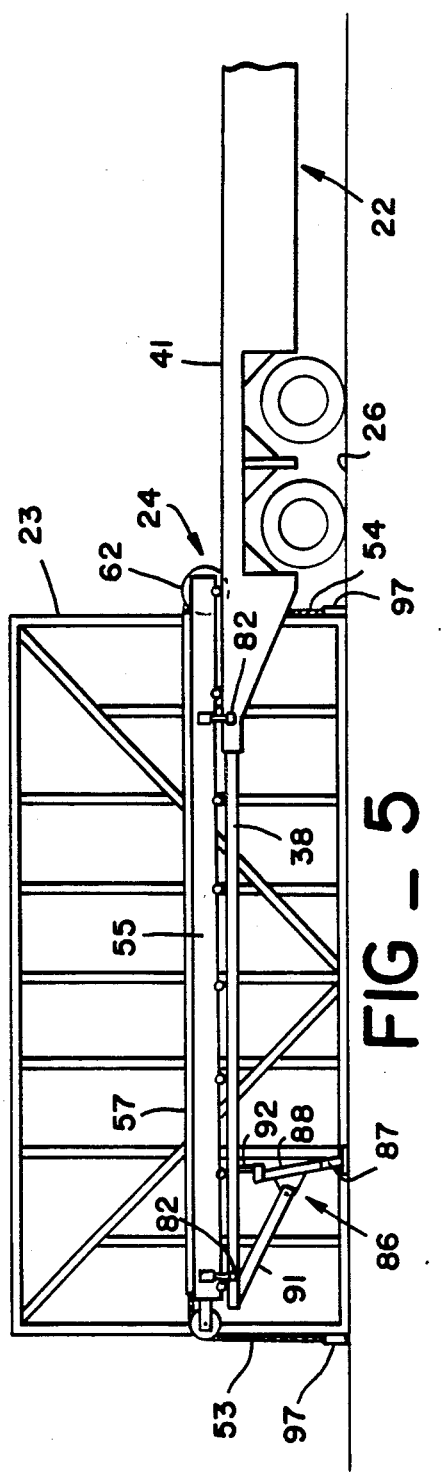

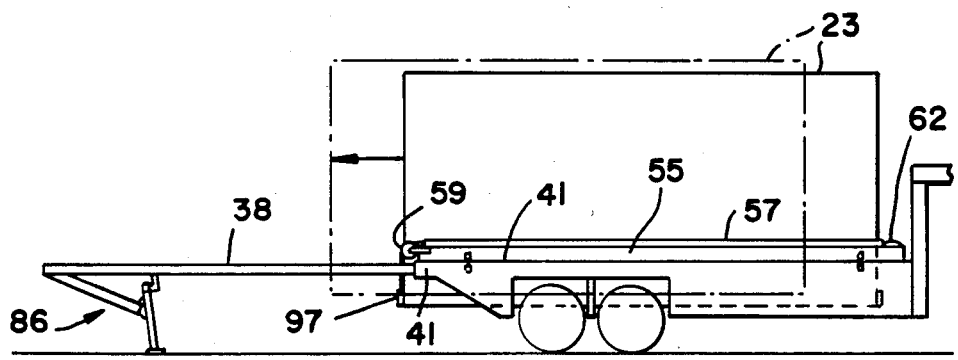
FIG_3
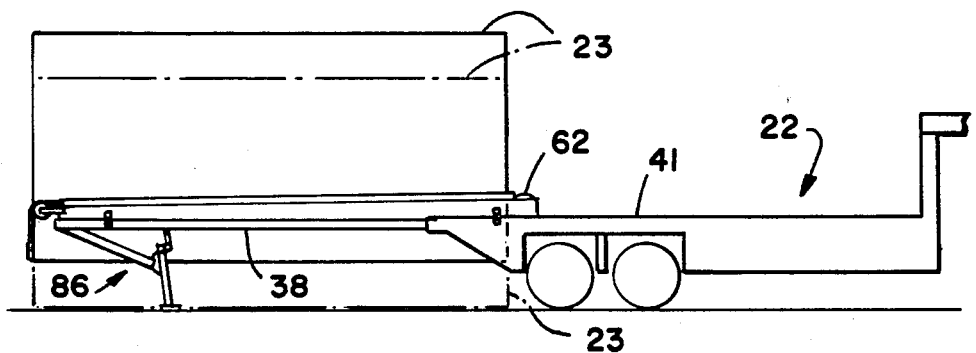
FIG_4
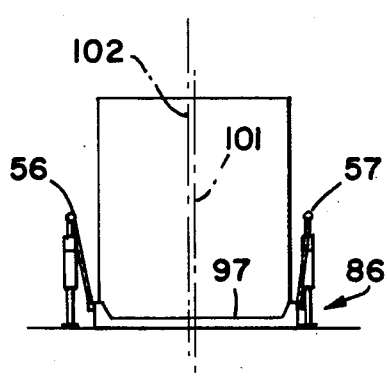
FIG_6
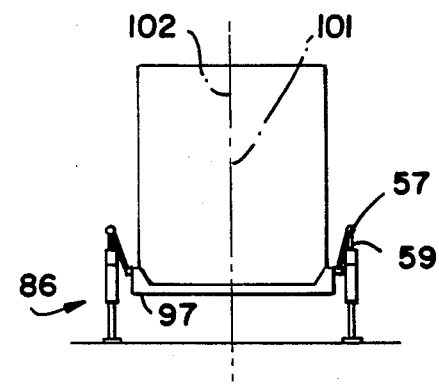
FIG_7

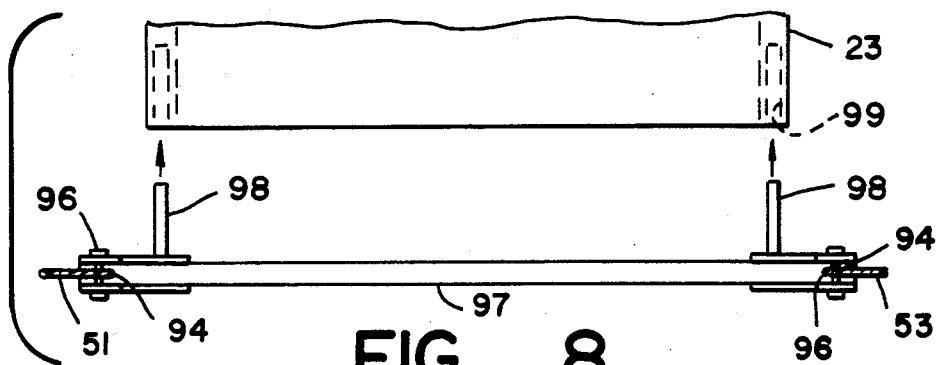
FIG_8
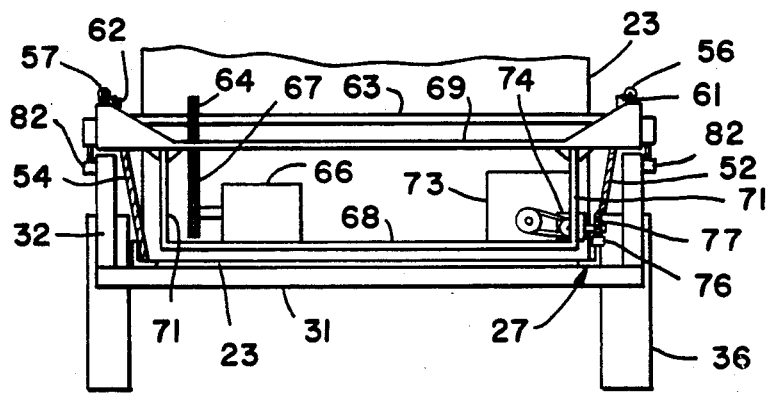
FIG_9
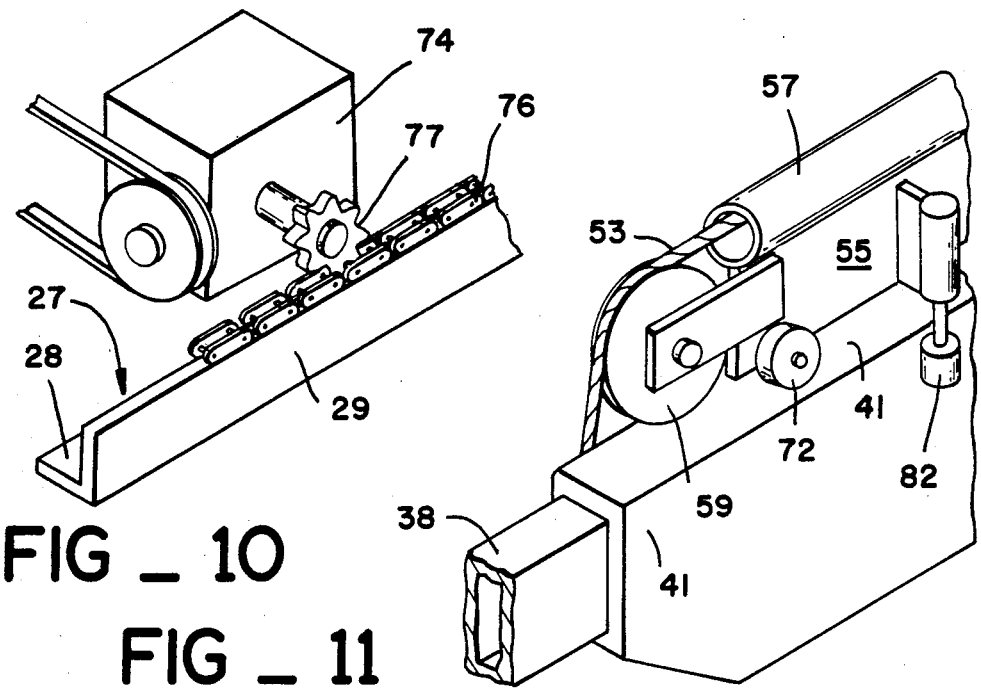
FIG_10
FIG_11

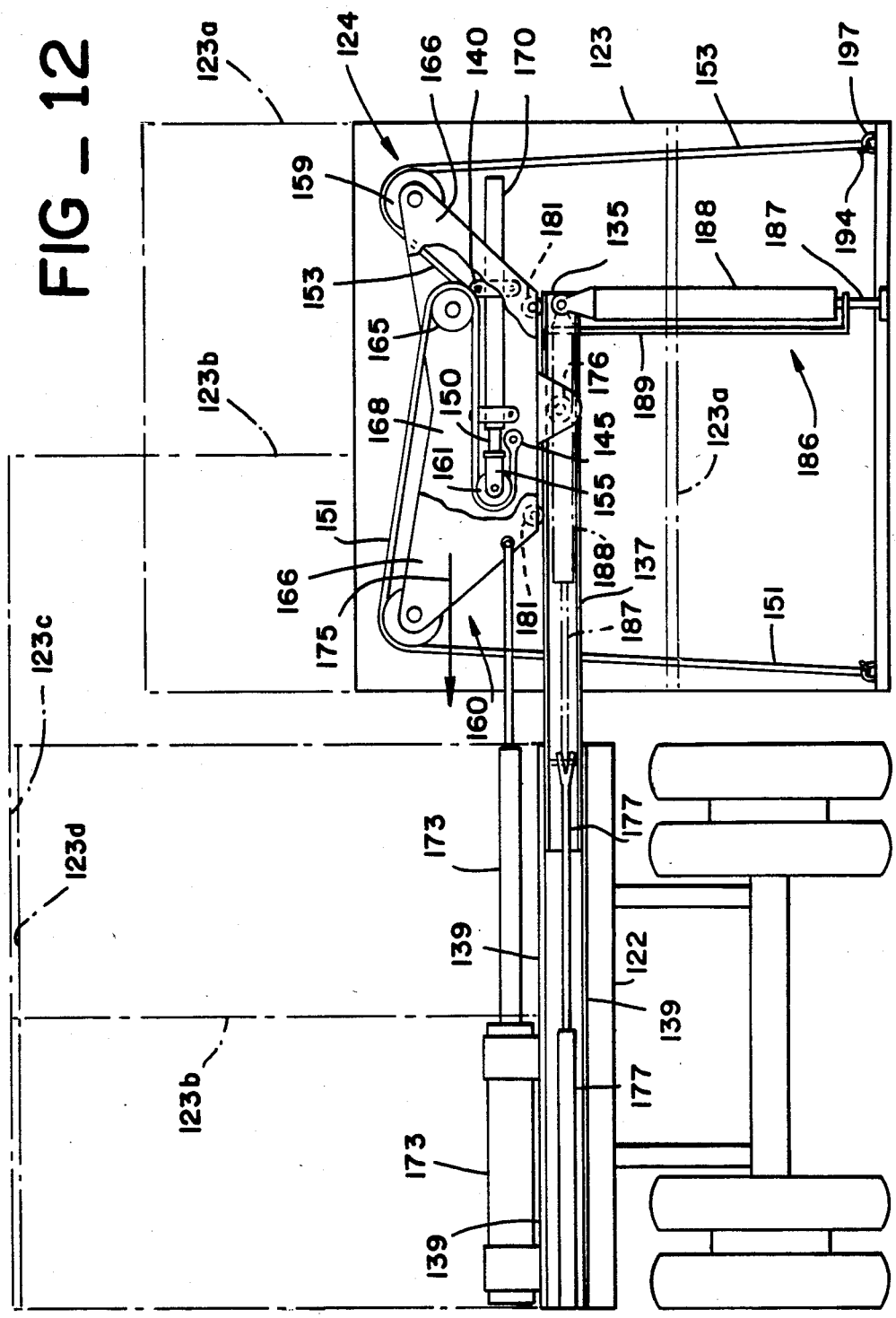

CONTAINER LOADER AND TRANSPORT ASSEMBLY

BACKGROUND OF THE INVENTION

In recent years there has been a tremendous increase in the use of so called "mini storage" facilities. The homeowner, having filled his garage to the point of making it unuseable for anything but storage, has been storing some of his seldom used possessions in small or mini, remote storage facilities. While this does relieve the problem which he has in connection with storing items, the process of loading the items into a transporting truck or trailer and then unloading them and reloading them into a secure remote storage facility is tedious and time consuming.

In the transportation industry large storage containers are widely used for the movement of goods and equipment from site to site. Such large containers provide an economical method for moving small items, and also can be used as a relatively secure structure for temporarily storing the goods which they contain. Typically in the transportation industry loading and unloading of containers is accomplished by forklift trucks or cranes. In the shipping industry, for example, a crane will be used to move the container from the deck of a cargo ship to the bed of a truck. While effective, this approach to the handling of goods requires very expensive equipment which is not readily available to the homeowner.

Another approach which has been used in the trucking industry has been detachable container-chassis systems in which the cargo box of a tractor and trailer assembly can be removed from the frame or chassis on which it is mounted to permit loading, unloading or storage of items in the container while the tractor and chassis are used for other jobs. Typical of such systems are the apparatus set forth in the U.S. Pat. Nos. 3,817,413, 3,520,433, 3,460,697, 3,425,576, 3,180,511 and 3,112,836.

Usually these detachable containers or cargo box systems include a plurality of legs which are carried by the container and can be used to lift the container up off of the truck chassis. The chassis is then driven away from the container and the container is either left standing on the legs or can be lowered by telescoping the legs to close proximity with the ground.

Such detachable containers-chassis systems, however, have been constructed in a manner which requires each of the containers to have some form of loading and unloading structure which may be used alone, or in combination with the structure carried by the truck and trailer. Moreover, the use of either fixed or telescoping legs has certain disadvantages. There can be problems with stability, particularly if the container is left unloaded and on support legs which elevate it a substantial distance off the ground. Most of the prior art telescoping leg systems are independently operable and therefore require several people to lower all of the legs simultaneously or else result in tilting of the container body as the user works around the container and lowers each leg a small increment.

Finally, the detachable container system has been widely employed in connection with refuse, namely, the demountable dumpster system. A large, usually open-top container is unloaded from a truck bed by tilting the bed and allowing the container to slide off onto the ground, at which point the truck is driven out from under the container. In loading the container back onto the truck, a cable is used to pull the container up on the tilted truck bed, and then the bed is pivoted to the horizontal position. While highly effective in dealing with refuse, this tilting container or dumpster approach is not suited for use with items which require care in handling.

OBJECTS OF THE INVENTION

Accordingly, it is an object of the present invention to provide a container loading, transport and unloading system which is suitable for use by an individual homeowner for remote storage of household items of the type typically stored in mini storage facilities.

It is another object of the present invention to provide a container loader and transport assembly which can be easily operated by a single person and will enable the container to be loaded and unloaded from a transport vehicle while the container is in a substantially horizontal orientation.

Still a further object of the present invention is to provide a container loading, transporting and unloading assembly in which a plurality of containers can be employed for long term storage and can be handled or serviced by a single trailer mounted loading and unloading apparatus so that each container is free of telescoping legs and other loading and unloading structures.

Still another object of the present invention is to provide a container loader and transport assembly and method which is well suited for use by a homeowner in storing household goods, is easy and inexpensive to use, provides a secure and durable storage facility, and can be effectively used with little instruction or prior experience.

The container loader and transport assembly of the present invention includes other objects and advantages which will be apparent from the accompanying drawing and are set forth in more detail in the description of the preferred embodiment.

SUMMARY OF THE INVENTION

The container loader and transport assembly of the present invention includes a wheeled, substantially horizontally oriented bed formed for support of a container thereon during transport of the container, and loading means formed for releasable coupling to the container and for lifting of the container onto the bed from the support surface and formed for lowering of the container from the bed to a support surface. The improved loader and transport assembly is comprised, briefly, of the loading means being movably mounted to the bed and formed for lifting and translation of the container relative to the bed and lifting of the container from, and lowering of the container to, a support surface located below the bed while maintaining the container in a substantially horizontal orientation during lifting and lowering. Most preferably, the loading means includes a pair of outrigger assemblies each formed and mounted for movement between an extended position outwardly of the bed and a retracted position proximate the bed. Additionally the loader includes lifting means, such as a cable and pulley assembly, supported on a carriage which is movable along the outrigger assemblies and coupled to the container for lifting and lowering of the container with respect to the outrigger assemblies. In order to move the container along the outrigger assemblies, translation means are provided on the carriage and coupled to move the carriage and container along the trailer bed and outrigger assemblies.

The method of the present invention includes the steps of transporting a container to a loading site by a transport vehicle, unloading the container from the vehicle, removing the vehicle from the site, loading the container with product at the site, returning the vehicle, transporting the container with the product by means of the vehicle to a storage site and unloading the container from the vehicle. The improvement in the method comprises the steps of during the loading an unloading steps, maintaining the container in a substantially horizontal orientation, and effecting loading and unloading by a loader mounted on the vehicle so that a single vehicle can provide a necessary loading, unloading and transport functions for a plurality of containers.

DESCRIPTION OF THE DRAWING

FIG. 1 is a side elevational view of a container loader and transport assembly constructed in accordance with the present invention.

FIGS. 3, 4 and 5 are side elevational views corresponding to FIG. 1 showing the container as it is being moved by the loader assembly from the loader trailer to a support surface.

FIGS. 6 and 7 are end elevational views of the container as it is being lifted by the loader and transport assembly of the present invention.

FIG. 8 is an enlarged, fragmentary, top plan view of a portion of the lifting structure employed in the loader and transport assembly of the present invention.

FIG. 9 is a fragmentary, partially broken away front end view taken substantially along the plane of line 9—9 in FIG. 1.

FIG. 10 is an enlarged, fragmentary, top perspective view of a drive assembly employed in the trailer of FIG. 1.

FIG. 11 is an enlarged, fragmentary, top perspective view of the rail support assembly of the loader of FIG. 1.

FIG. 12 is an end elevational view, partially broken away, of an alternative embodiment of the container loader and transport assembly of the present invention.

DESCRIPTION OF THE PREFERRED EMBODIMENT

Figure 2:
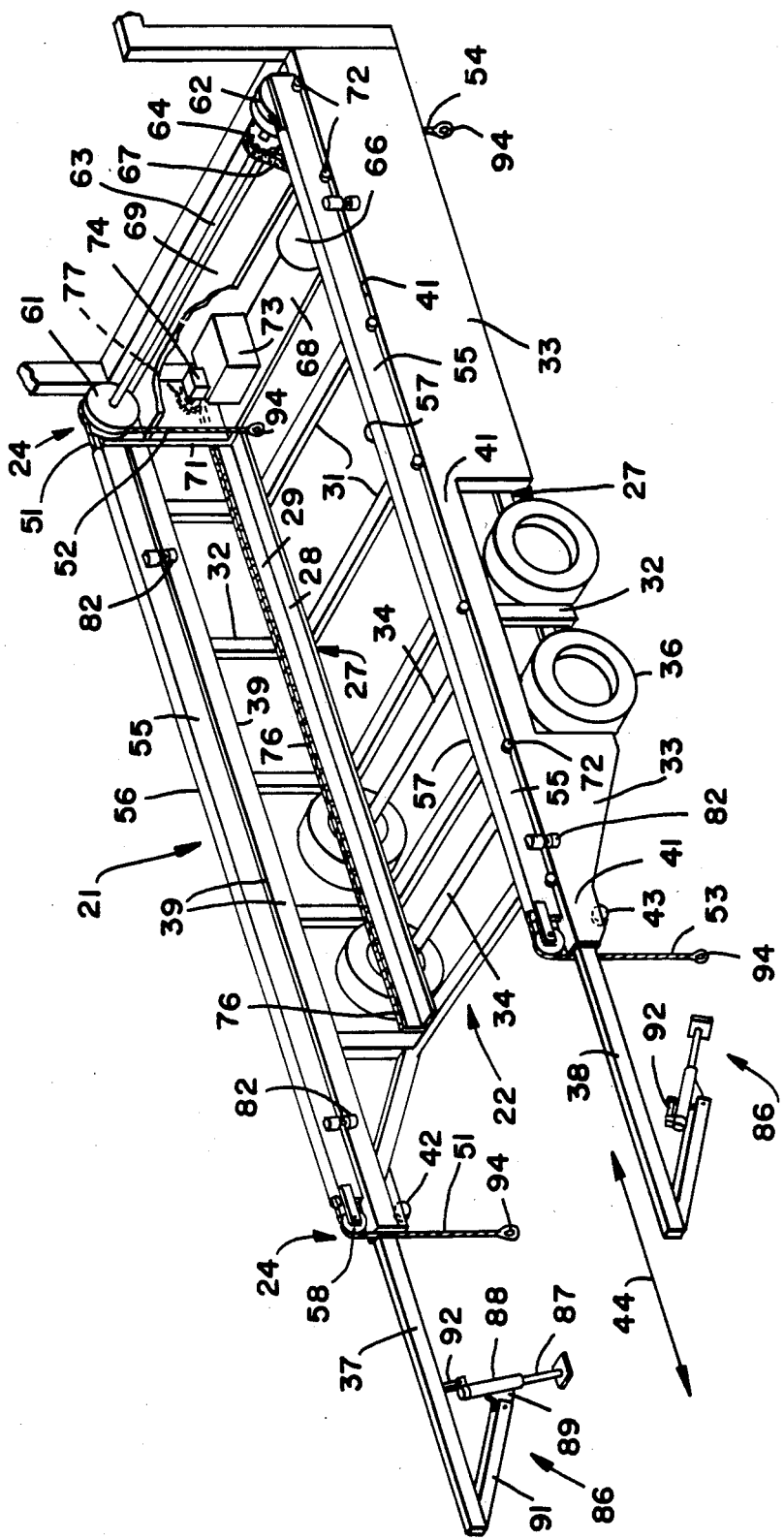
FIG. 2 is an enlarged, top perspective view with the container off of the loader and transport assembly of FIG. 1.

The container loader and transport assembly of the present invention can be incorporated into a trailer, such as is shown in FIGS. 1 through 11, or it can be mounted on the back of a flat bed truck, or the trailer of a tractor-trailer combination such as is shown in FIG. 12. In either case, the loader and transport assembly is constructed so that the loading or lifting mechanisms are all carried by and permanently mounted on the transport portion of the overall assembly. This enables use of a single transport vehicle in connection with a plurality of the containers, none of which have special feet, legs, or lifting and lowering mechanisms.

The container loader and transport assembly of the present invention includes certain basic elements which are common to prior art container handling systems. Thus, the loader and transport assembly 21 includes a wheeled, substantially horizontally oriented bed, generally designated 22 and best seen in FIG. 2, formed for support of container 23 thereon. The assembly also includes movably mounted loading means, generally designated 24, formed for lifting of container 23 onto bed 22 from a support surface 26 below the bed and formed for lowering of the container from the bed to the transport surface.

Trailer bed 22 can advantageously be formed by a pair of longitudinally extending L-shaped channel members, generally designated 27, which each include a horizontally extending flange 28 and an upstanding flange 29. Mounted between channel members 27 are a plurality of transverse bed frame members 31, and the ends of members 31 are preferably coupled to channels 27 and vertical frame elements 32. Side panels 33 can be secured to the exterior of frame members 32 so as to enclose the sides of the trailer. Also mounted to longitudinal frame elements 27 are axles 34 for support of the trailer wheels 36.

In order to avoid the necessity of having specialized retractable leg structures or loading and unloading mechanisms which are carried by container 23, the loader and transport assembly of the present invention includes loading means 24, which is movably mounted to bed 22 and is formed for releasably coupling to the container. Moreover, loading means 24 is formed for lifting and lowering of the container to and from support surface 26 and movement of the container to and from bed 22 while maintaining the container in a substantially horizontal orientation. This enables the loader and transport assembly of the present invention to lift a container in which valuable possessions are stored without tipping the container and possibly damaging the possessions during the loading and unloading processes.

In the preferred form, loading means 24 includes a pair of outrigger assemblies, such as rail elements 37 and 38 mounted in channels 39 and 41, which channels extend longitudinally along the trailer and are supported by upright frame members 32. Channels 39 and 41 are dimensioned for sliding receipt of outrigger rails 37 and 38, and preferably include roller elements 42 and 43 which engage and movably support the lower surface of the rails. Additionally, rails 37 and 38 preferably include a second roller element (not shown) carried by the inner end of the rails which engages the inside of channels 39 and 41 so as to further facilitate movement of the rails inwardly and outwardly of the channels, as indicated by arrow 44.

As shown in FIG. 1, outrigger rails 37 and 38 are positioned in a retracted position alongside and proximate of bed 22. In FIGS. 3, 4 and 5, rails 37 and 38 are in an extended position outwardly of bed 22 to permit raising and lowering of the container.

In addition to the outrigger assemblies, loader means 24 further includes a container lifting means in a form of a pulley and cable assembly and container translation means in the form of a carriage coupled to support and move the container along the bed and outrigger rails of the loader.

In order to permit lifting and lowering container 23 while the container is maintained in a substantially horizontal orientation, it is preferable that the cable and pulley assembly of the lifting means include four cables with a pair of cables 51 and 52 mounted on one side of the loader for support from rail 37 and bed channel 39 and a second pair of cables 53 and 54 mounted on the opposite side of the bed for support from rails 38 and frame channel 41. Cables 51 and 53 pass through longitudinally extending guide tubes 56 and 57 secured on top of longitudinally extending beams or movable frame members 55 which have mounted proximate the ends thereof pulleys or sheave 58 and 59. The inner ends of cables 51 and 53 are coupled to pulleys 61 and 62 which are both double grooved pulleys. Coupled to the other groove of double grooved pulleys 61 and 62 are cables 52 and 54, and pulleys 61 and 62 are coupled by a common drive shaft 63 on which is mounted drive sprocket 64. Powering of the pulley assembly is provided by motor 66 and appropriate reduction gears which are used to drive a chain 67 mounted between drive sprocket 64 and motor 66.

In order to permit the containers to be moved from a position over bed 22 as shown in FIG. 1 to a position for loading and unloading, as shown in FIG. 4, the loader means also includes translation means for movement of the container along the loader bed and along the outrigger assemblies. The entire assembly of pulleys 61, 62, sprocket 64 and motor 66 are mounted to a movable carriage including longitudinal frame member 55 on which guide tubes 56 and 57 are mounted and lower frame element 68 upper frame 69 and vertical frame elements 71. In order to permit translation or movement of the lifting carriage along channels 39 and 41 and the rails 37 and 38 roller elements 72 are mounted for support of the lifting assembly on the top surface of channels 41 and 39 and auxiliary alignment rollers 82 cause the overall assembly to track the channels and rails.

In the preferred from, the motive force for the translation means includes a motor 73 mounted to transverse frame member 68 for movement with the carriage and the pulley assembly mounted thereon. The translation means includes a track 76 mounted to bed 22 and a mating sprocket 77 coupled to gear reducer box 74, which in turn is coupled to motor 73 carried by the transverse frame member 68. Track 76 may advantageously be provided as a link chain fixedly mounted (for example, by welding) on upwardly extending flange 29 of one of the longitudinally extending bed frame elements 27. As best may be seen in FIG. 10, sprocket 77 walks along chain lengths 76, which are mounted to leg 29 of the longitudinal frame element. This in turn causes the entire movable frame assembly (55, 56, 57, 68, 69 and 71), which carries drive motor 73 and the cable drive motor 66, to move along the bed 22 to a position proximate wheels 36. Since the cable guides 56 and 57 are also coupled to the frame structure, the lifting mechanism is essentially mounted on a movable carriage which moves along the upper surface of channels 39 and 41 (on its inner end) and the upper surface of outrigger rails 37 and 38 (at its outer end).

Finally, the outrigger rails 37 and 38 preferably include a ground support or leg structure, generally designated 86, which is foldably mounted to each of rails 37 and 38 for movement between a stored position proximate the rail elements (shown on the righthand side of FIG. 2) and a deployed position substantially transverse or perpendicular to the rail elements (shown on the lefthand side of FIG. 2). Ground support legs 86 preferably include an extensible leg 87 which is telescoped into housing 88. Pivotally mounted to a bracket 89 on housing 88 is a bracing member 91. Also pivotally mounted to housing 88 is a support member 92 which engages the underneath surface of the rail to enable rigid support of the rail and yet folding of leg structure 86 upon pivoting of member 92 downwardly.

Operation

In operation the container loader and transport assembly can be used by a storage company to provide mini storage for homeowners as follows. The container is brought to the homeowner's home by truck 93 and the present loader assembly 21. The full load of the container is supported on bed 22 and particularly horizontal bed flanges 28. The weight of the lifting carriage is supported on the side frames of the bed, that is, rollers 72 engage the top surface of the longitudinally extending channels 39 and 41. The cables 51-54 preferably are not used to support the container from the side frames during transport.

The operator can simply pull rails 37 and 38 outwardly to the extended position shown in FIG. 3 while the container is supported on the bed and the lifting carriage is supported from the side frame portion of the bed. Ground support legs 86 are lowered and the extensible foot portions 87 adjusted until the outer ends of the rails are supported at about the same height from the ground as the inner ends of the rails.

Container 23, which has been resting on horizontal flanges 28 of the longitudinally extending frame members 27, now is lifted up off the flanges 28 by the pulley and pulley drive assembly. This can be seen in FIG. 3 by a slightly elevated position of the container in phantom lines, and it is accomplished by drive motor 66, which rotates shaft 63 and thereby reels in slightly cables 51, 52, 53 and 54 to produce vertical motion and lifting of the container.

Once container 23 is lifted off of bed 22, the container and lifting carriage can be moved along the bed and rails by translation drive motor 73. Motor 73 is therefore actuated and sprocket 77 walks along the fixed chain track 76 so as to drive the lifting carriage and the container along channels 39 and 41 and thereafter along rails 37 and 38 until the container reaches the solid line position shown in FIG. 4. At this position, the innermost end of the container is beyond the last transverse frame member 31 of bed 22, which permits the container to be lowered down to ground or support surface 26. Drive motor 66, therefore, now is used to lower all four cables 51-54 simultaneously until the container reaches the phantom line position in FIG. 4 or the solid line position as shown in FIG. 5.

It will be seen that the container lifting carriage, including the drive motors and pulley assemblies, is now down at the rear end of the trailer. In the form of the pulley assembly shown in the application, the ends of cables 51-54 are provided with eyelets 94 which can be pinned by pins 96 to a transversely extending bar element 97. Protruding from bar element 97 are lifting forks 98 which are slidably received in sockets for channel members 99 in the ends of the container, as shown in FIG. 8. Once the container is lowered onto the ground, therefore, the transverse bar elements 97 on the front and rear of the container can be removed so as to uncouple the container from the lifting assembly.

After the container is uncoupled, the cables can be reeled in by motor 66 and the carriage moved back over the side frames of the bed by translation drive motor 73. Finally, the rails can be retracted and the loader and transport assembly taken away for use in transporting another container.

The homeowner then can load the container with possessions at his convenience, and once loaded call the storage company to pick up the container. The storage company will return, and the loading process is simply a reverse of the unloading process, although a substantial advantage of the apparatus of the present invention can be seen with respect to loading of the containers from FIGS. 6 and 7.

As will be understood, in most cases there will be some misalignment of the trailer with respect to the container when the trailer is backed up into general alignment with the container. This misalignment is shown in FIG. 6 wherein center line 101 is the center line of the container and center 102 is the center line of the trailer and loading mechanism. As will be appreciated, there also may be some longitudinal skewing of the center lines. During loading, however, the cables can be lowered and coupled to transverse container lifting members 97, notwithstanding the fact that the container is to one side of or skewed relative to the loaded assembly. The cables will accommodate such lateral shifting. Once the motor 66 lifts the container up off the ground, the cables will automatically swing or shift the container to align the center line of the container with the center line of the trailer, as indicated by a single line in FIG. 7. Thus, the cable system produces alignment of the container with the trailer bed as lifting occurs and enables the lifted container then to be translated back onto the bed in alignment with the L-shaped longitudinally extending bed support beams 27.

It should be noted that the container which is left at the homeowner's site does not have any costly or complicated lifting or leg structure. Thus, the investment in lifting mechanism is minimized. This is particularly important in light of the fact that the container will then be taken by the storage company to a remote storage site, in which the container can be left for extended periods of time without tying up investment in lifting mechanisms or leg mechanisms that accompany the container.

An alternative embodiment of the container loader and transport assembly of the present invention is shown in FIG. 12. The loader assembly 121 of FIG. 12 is formed for loading and unloading from the side of the bed 122 of a transport vehicle such as a flatbed truck or the trailer of a tractor and trailer assembly. Container 123 is shown in solid lines beside the bed 122 and is shown in phantom lines, as it is progressively raised, moved laterally and finally lowered onto bed 122, by reference numerals 123a–123d, respectively. The loading or lifting means 124 is again preferably formed as a pulley and cable assembly with four cables, two cables on each end of the container such as cables 151 and 153, releasably coupled by hooked ends 194 to eyelets 197 secured, for example by welding to the container. Cables 151 and 153 pass over a pair of pulleys 159 mounted to a carriage, generally designated 160, which is preferably comprised of a pair plate members 166 and 168. Both of cables 151 and 153 then pass around a double groove pulley 165 which is fixedly mounted between plates 168 and 166 and further pass around a movable double grooved pulley 161 rotatably mounted by bracket 155 to movable piston 150. In order to secure the cables in place, ends 145 are fixedly secured by a pin between plates 166 and 168. As will be appreciated, therefore, upon displacement of piston 150 out of cylinder 170, in the direction of arrow 175, the cable hooks 194, and thus the container, will be lifted. Cylinder 170 may be coupled to frame members 166 in a variety of manners, for example, by brackets 140 or the like, and the hydraulic system including pumps and connected conduits and reservoirs are not shown for simplicity of illustration.

In a manner similar to the assembly of FIGS. 1 to 11, the loader and transport assembly of FIG. 12 includes a pair of rails, such as rail 137, which are mounted in channels such as transversely extending channel 139 for movement between an extended and a retracted position. In order to facilitate such movement, a two stage hydraulic cylinder assembly 173 is shown connected to carriage 160, for powered extension and retraction of the carriage and container. As will be understood a gear reduction box driven by a hydraulic motor as described in connection with FIGS. 1–11 also could be used. Additionally, the ends 135 of the rails 137 can be provided with a pivotally mounted leg assembly 186, which can also have a hydraulically extensible foot 187. It is preferable that extensible foot 187 can be selectively coupled to and uncoupled from piston cylinder 177 to enable the cylinder 188 and 177 to have a combined stroke for retraction of rails 137. Additionally, leg assembly 186 can include cylinder retraction strap 189 which can be latched to the foot assembly and used to retract the same.

Translation of the lifting carriage 160 along rail 137 and channel 139 can be accomplished by providing roller elements 181 which engage the top of the channel and the rail and an internal roller 176 which engages underneath the upper flange of C-shaped rail 137 so as to enable movement of the carriage with respect to the rail. It will be noted that the channel 139 into which rail 137 telescopes is open so as to permit lateral translation of the carriage along channel 139 when drive roller 176 reaches channel as the container is moved over bed 122.

As will be appreciated, both ends of the loader assembly 124 are constructed in the same manner, and it is contemplated that synchronous operation of the lift cylinders 170 can be accomplished through tandem mounted, equal volume hydraulic pumps, driven, for example, by a common drive shaft (which are shown). The two energy sources can be kept separate by a dual valve system have a common control lever to raise and lower the container and move the container carriage.

If required, orificing of the "off load" side of the rams can be used to create a pressure charge to the hydraulic system, and unison operation will occur as long as the system is operated below the load capacity so that fluid is not dumped back to the hydraulic reservoir past pressure relief valves.

As was the case for the loader and transport assembly of FIGS. 1 through 11, assembly 121 maintains the container 123 in a substantially horizontal orientation during all phases of lifting and lowering of the container. Moreover, cable system will allow the container to shift longitudinally between the end rails 137 so as to automatically center the container between the rails, particularly when the container is lifted after loading.

As will be appreciated, a hydraulic motor and sprocket also could be used to drive carriage 160 along a roller link chain mounted to outrigger beam 137. Additionally, the container can be provided with casters or other rolling elements to permit the homeowner to move the container.

What is claimed is:

1. A container loader and transport assembly including an elongated bed having carriage support surfaces extending longitudinally along opposite sides of said bed, a wheel assembly mounted to said bed intermediate opposite ends thereof for rolling support of said bed, outrigger assemblies mounted to said bed for movement between an extended position outwardly of and longitudinally aligned with said support surfaces and a retracted position proximate said bed, carriage means mounted to said bed for movement on said support surfaces and said outrigger assemblies in said extended position, drive means coupled to move said carriage means along said support surfaces and said outrigger assemblies, lifting means mounted to said carriage means and formed for lifting and lowering of a container to and from a support surface and said carriage means with said container in a substantially horizontal orientation, wherein the improvement in said container loader and transport assembly comprises:

said support surfaces extending rearwardly of said wheel assembly;

said bed intermediate said support surfaces terminating proximate said wheel assembly to define with said support surfaces a rearwardly opening notch dimensioned to receive a front facing end of said container between said support surfaces and proximate said wheel assembly; and said carriage means is mounted for movement along said bed and said outrigger assemblies between a transport position at which said container means is positioned for support on said bed and a lifting and lowering position at which said front facing end is positioned in said notch, a rear facing end is positioned between said outrigger assemblies and said carriage is supported in part on said support surfaces of said bed and in part on said outrigger assemblies.

2. The container loader and transport assembly as defined in claim 1 wherein, said carriage means includes a pair of carriage frame members extending along opposite sides of said bed over said support surfaces at a distance dimensioned for receipt of said container therebetween, a plurality of roller elements mounted to said carriage frame members for rolling support of said carriage frame members on said support surfaces and said outrigger assemblies, guide tubes mounted to and extending over the length of each of said carriage frame members, cable drive means mounted to and extending transversely between said carriage frame members proximate one end of said guide tubes, pulley means mounted to each of said carriage frame members proximate an opposite end of said guide tubes, a first pair of cables with one cable slidably mounted in each of said guide tubes and movably supported on said pulley means proximate one end and coupled to said pulley drive means proximate an opposite end, and a second pair of cables coupled to said cable drive means, said first pair and said second pair of cables being releasably coupled at ends thereof remote of said cable drive means to said container.

3. The container loader and transport assembly as defined in claim 1 wherein, said support surfaces are provided by upwardly facing surfaces on tubular bed members positioned to extend along opposite sides of said bed, said outrigger assemblies are provided by elongated outrigger rails mounted in telescoped relation to said tubular bed members for movement between said extended position and said retracted position.

4. The container loader and transport assembly as defined in claim 3 wherein, said outrigger assemblies each include a support leg assembly having a bracing strut pivotally mounted at one end to a distal end of said outrigger rails, and a vertically extensible leg pivotally mounted to said bracing strut at an opposite end thereof and formed for selective engagement with and disengagement from said outrigger rails at a position inwardly of said distal ends for support of said rails in said extended position and pivotal movement of said leg assemblies in a direction along said rails for storage in said retracted position.

* * * * *